US010976149B2

(12) United States Patent
Habens

(10) Patent No.: US 10,976,149 B2
(45) Date of Patent: Apr. 13, 2021

(54) STRAIN GAUGE

(71) Applicant: DATUM ELECTRONICS LIMITED, Isle of Wight (GB)

(72) Inventor: Malcolm Habens, Isle of Wight (GB)

(73) Assignee: DATUM ELECTRONICS LIMITED, Isle Of Wight (GB)

(*) Notice: Subject to any disclaimer, the term of this patent is extended or adjusted under 35 U.S.C. 154(b) by 0 days.

(21) Appl. No.: 16/344,929

(22) PCT Filed: Oct. 25, 2017

(86) PCT No.: PCT/GB2017/053220
§ 371 (c)(1),
(2) Date: Apr. 25, 2019

(87) PCT Pub. No.: WO2018/078365
PCT Pub. Date: May 3, 2018

(65) Prior Publication Data
US 2019/0265016 A1 Aug. 29, 2019

(30) Foreign Application Priority Data
Oct. 28, 2016 (GB) ..................................... 1618295

(51) Int. Cl.
*G01L 1/00* (2006.01)
*G01B 7/16* (2006.01)
*G01L 1/04* (2006.01)
*G01L 1/22* (2006.01)

(52) U.S. Cl.
CPC .................. *G01B 7/18* (2013.01); *G01L 1/04* (2013.01); *G01L 1/2206* (2013.01)

(58) Field of Classification Search
CPC ............ G01B 7/18; G01L 1/04; G01L 1/2206
USPC ....................................................... 73/862.627
See application file for complete search history.

(56) References Cited

U.S. PATENT DOCUMENTS

| 3,780,817 A | * | 12/1973 | Videon ................. G01G 19/12 177/136 |
| 4,009,608 A |   | 3/1977  | Ormond |
| 4,233,837 A | * | 11/1980 | Canfield ................ B65H 59/40 73/862.474 |
| 4,251,918 A |   | 2/1981  | Duggan |
| 4,299,130 A | * | 11/1981 | Koneval .................. G01B 7/20 338/2 |
| 5,230,252 A | * | 7/1993  | O'Brien .................. G01B 7/18 177/211 |
| 6,122,978 A |   | 9/2000  | Callendrier |

(Continued)

OTHER PUBLICATIONS

International Search Report for corresponding International Application No. PCT/GB2017/053220 dated Jan. 19, 2018.

(Continued)

*Primary Examiner* — Max H Noori
(74) *Attorney, Agent, or Firm* — Pearne & Gordon LLP

(57) ABSTRACT

A strain gauge for mounting on a surface includes first and second mounting pads arranged for securing to respective first and second portions of the surface. The first and second mounting pads have respective first and second upstanding walls each arranged to extend away from the surface to a bridging portion extending between the first and second upstanding walls. The strain gauge has a strain sensing element secured to one of the first and second upstanding walls.

16 Claims, 5 Drawing Sheets

(56) References Cited

U.S. PATENT DOCUMENTS

| | | | |
|---|---|---|---|
| 8,820,172 B2* | 9/2014 | Bouillot | B64C 9/02 |
| | | | 73/761 |
| 9,372,125 B2 | 6/2016 | Geldman | |
| 2001/0047209 A1* | 11/2001 | Solomon | A61H 1/02 |
| | | | 623/18.11 |
| 2010/0251834 A1* | 10/2010 | Maeda | G01L 1/2206 |
| | | | 73/862.627 |
| 2013/0061689 A1 | 3/2013 | Mehlmauer et al. | |
| 2014/0262551 A1* | 9/2014 | Santi | G01G 19/083 |
| | | | 177/1 |
| 2015/0020601 A1 | 1/2015 | Miyajima et al. | |
| 2016/0245711 A1 | 8/2016 | Berme et al. | |
| 2017/0268949 A1* | 9/2017 | Schumacher | G01L 9/0002 |

OTHER PUBLICATIONS

Written Opinion for corresponding International Application No. PCT/GB2017/053220 dated Jan. 19, 2018.
British Search Report for corresponding British Application No. GB1618295.8 dated Sep. 26, 2017.

* cited by examiner

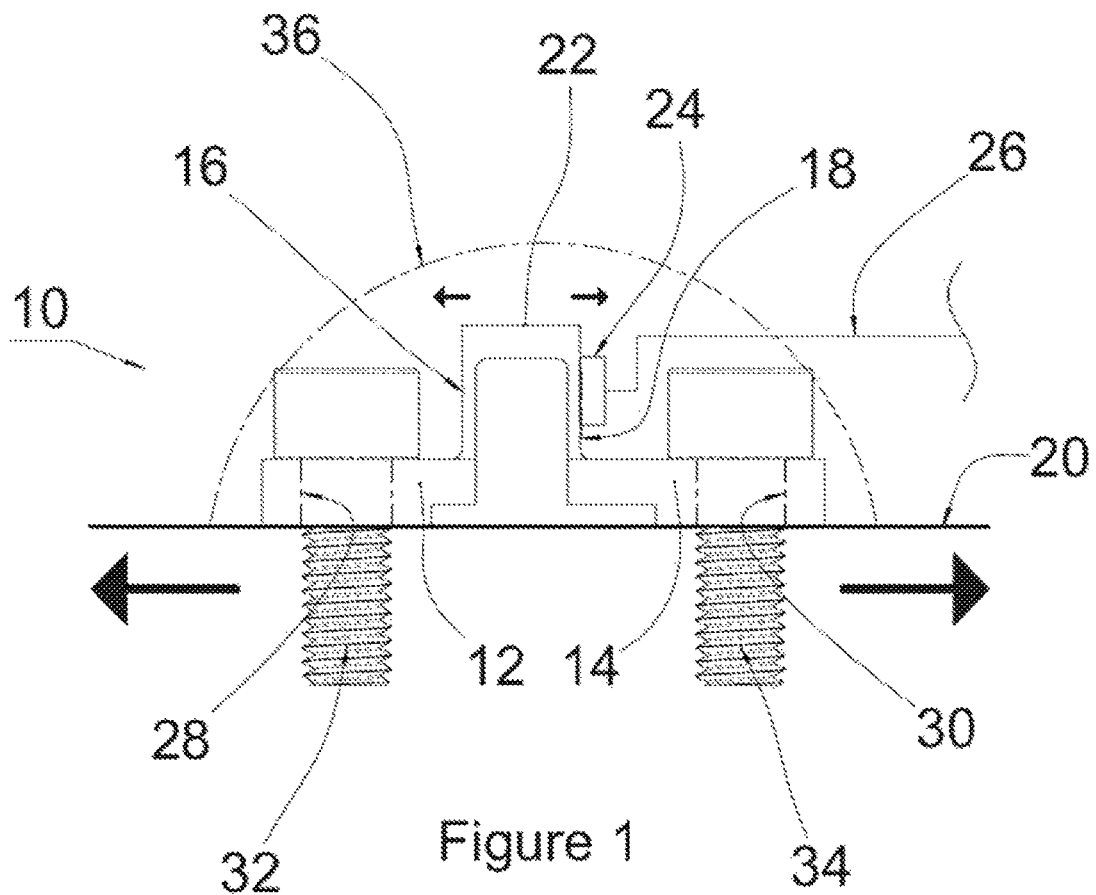
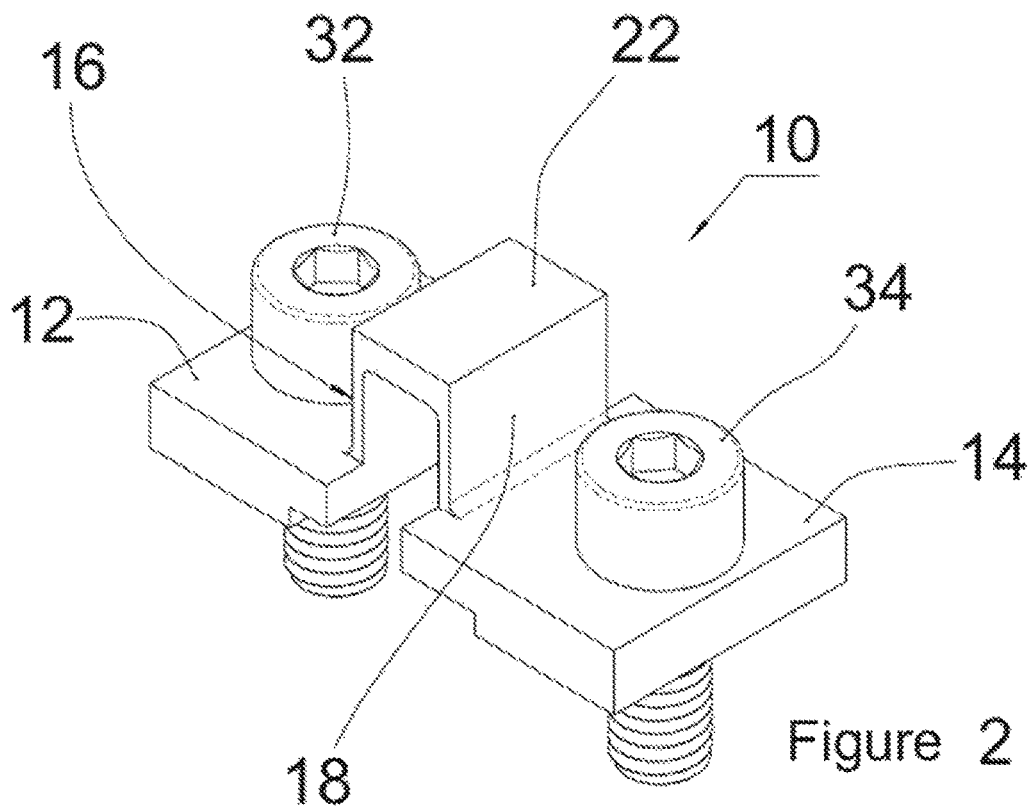

STRAIN GAUGE

The present invention relates to a strain gauge. In particular, the invention relates to a bolt-on strain gauge which may be bolted to a surface, the strain within which it is desired to measure.

Strain gauges are well known devices used to measure strain on a portion of an object. Examples of such an object include vehicles, such as trucks, trains and ships; large structures, such as bridges, silos and building frames; and items of machinery. The measured strain may be used for a variety of applications such as, for example, weighing, overload protection, stress monitoring and monitoring structural movement such as creep.

The general operating principles of a strain gauge are as follows. A strain gauge includes first and second ends which are attached to the portion of the object, the strain on which it is desired to measure. A sensing element is located between the first and second ends of the strain gauge. The sensing element undergoes a change in a property as the strain in the portion of the object to which the strain gauge is attached changes. The most common property of the sensing element which changes with a change in strain is the electrical resistance of the sensing element.

In a known type of strain gauge, the sensing element includes an insulating flexible backing which supports a metallic, conductive foil pattern. When the portion of the object to which the strain gauge is attached is under strain and is deformed, the ends of the strain gauge which are attached to the relevant portion of the object move relative to one another thereby causing deformation of the strain gauge itself. The deformation of the strain gauge results in deformation of the sensing element, and in particular, of the metallic foil pattern. The resistance of the metallic foil pattern depends upon the geometry of the foil pattern itself. Consequently, as the foil is deformed, the electrical resistance of the foil also changes. It follows from the above that measuring the electrical resistance of the metallic foil pattern is indicative of the strain on the portion of the object to which the strain gauge is attached. The change in resistance of the metallic foil pattern can be measured in any appropriate way, either directly or by incorporating the element in a Wheatstone bridge, and is related to the strain on the relevant portion of the object to which the strain gauge is attached by a quantity known as the gauge factor.

It is known for strain gauges to be attached to the portion of the object on which strain is to be measured in a number of ways. One way is for the strain gauge to be attached to the relevant object portion using adhesive. Another way is for each end of the strain gauge to include a bolt hole and for the strain gauge to be bolted to the relevant object portion. In line with what has already been discussed, a bolt on strain gauge (i.e. a strain gauge that is bolted to a relevant object portion) comprises an element which is bolted to the structure. Any deformation of the portion of the object to which the strain gauge is bolted will cause the element to deform. The deformation of the element is measured by a strain sensing element applied to the element.

In strain gauges which are bolted to the portion of the object on which strain is to be measured, any deformation of the relevant portion of the object is transmitted to the strain gauge via the bolts at each end of the strain gauge. In particular, the deformation may be transmitted by frictional forces, between the relevant portion of the object and the strain gauge, which result from the clamping force of the relevant bolt. In some applications it has been found that if the deformation of the portion of the object on which strain is to be measured is such that a significant load is applied through the bolt fixings, the load may be sufficient to overcome the frictional forces between each end of the strain gauge and the relevant portion of the object due to the bolts, such that slipping occurs between the strain gauge and the relevant portion of the object. It will be appreciated that such slipping will result in the strain gauge no longer accurately indicating the strain on the relevant portion of the object and hence the strain gauge functioning in an unacceptable manner. Some designs have been proposed to improve compliance but generally suffer from increased complexity (typically requiring multiple strain gauges on separate surfaces) and/or reduced reliability of measurement.

Typically, a distinction is made between strain gauges and load cells. A strain gauge is a sensor has a geometry-dependent characteristic which can be used to determine small movements characteristic of strain in a surface. A load cell typically incorporates strain gauges, but is designs specifically to incorporate a load path. The structure of the load cell is specifically designed to include a load path, and the body of the load cell is arranged to deform in response to the loads that it measures, making use of the springiness of the material from which it is constructed and the dimensions of the body (taking account of the loads expected in the context). Consequently load cells do not measure strain in a surface so much as they measure strain within themselves, using this strain to determine a force. The present invention is much more like a strain gauge, in that it is directed towards measuring strain in a surface, rather than force (via a strain measurement). As will be clear from the following description, this is achieved by an arrangement which uses a bridging portion and upstanding walls to improve the sensitivity of a strain gauge to small strains in the underlying surface. However, the device is not designed to have a load path through the strain measuring portions, hence the distinction from load cells; fundamentally are different concepts at work in load cells compared with the present invention.

According to a first aspect of the invention there is provided a strain gauge for mounting on a surface, the strain gauge comprising first and second mounting pads arranged for securing to respective first and second portions of the surface, the first and second mounting pads having respective first and second upstanding walls each arranged to extend away from the surface to a bridging portion extending between the first and second upstanding walls, the strain gauge having a strain sensing element secured to one of the first and second upstanding walls.

By having a structure in which the strain gauge has upstanding walls and a sensing element secured to one of the upstanding walls, this makes it possible for the strain gauge to have a compliant design which may reduce loading between the first and second mounting pads. In addition, by having a structure in which the strain gauge has upstanding walls and a sensing element secured to one of the upstanding walls, this makes it possible for the sensing element to have sub elements which are both attached to the same surface of one of the upstanding walls, making manufacturing the strain gauge more straightforward and therefore cheaper.

For completeness (as can be seen from the Figures of the embodiments) the mounting pads are spaced apart with no other substantial element joining them other than the bridging portion so no load path in parallel with the bridging portion exists. It will be appreciated that the strain gauge described herein thus measures strain in the surface to which it is mounted in such a way that the force required to produce a given strain in the sensing portions of the device (e.g. by resistance change) is primarily a function of the structural properties of the surface to which the sensor is mounted. By contrast, load cells operate by way of structural, load bearing portions being deflected in response to a force, which in turn results in a strain. The present arrangement results, due to the indirect load path via upstanding walls and the bridging portion, in a greater compliance for strain measurements.

In other words the invention provides a strain gauge for mounting on a surface, the strain gauge comprising first and second mounting pads arranged for securing to respective first and second portions of the surface, the first and second mounting pads having respective first and second upstanding walls each arranged to extend away from the surface to a bridging portion extending between the first and second upstanding walls, the strain gauge having a strain sensing element secured to one of the first and second upstanding walls, wherein there is a gap between the first and second mounting pads and the bridging portion spans over the gap. For example, the upstanding walls and bridging portion form a rough n-shape connecting the two mounting pads. Since the mounting pads are configured to be firmly secured to the surface, strain in the surface results in movement of the mounting pads, which causes a deformation in the walls and/or bridging portion.

As set out above, this arrangement improves the compliance of the device. The specific shape of the sensor allows the strain to be amplified or attenuated according to the intended implementation. Amplification may be beneficial where the strains are expected to be small. Attenuation may be beneficial where the strains are large. In particular, if the strains cause the material of the surface to exceed the linear strain limit, attenuation can help to prevent the strain sensor from also being taken beyond its linear limit. Were the sensor to no longer behave linearly, the output data would be harder to interpret. Finally, since it is possible to control the relationship between the force on the sensor from the surface to which it is secured and the degree of deformation of the sensor to the maximum strain, the relationship can be selected so that the force for maximum deformation is well within the force by which the sensor is secured to the surface (shear strength of bolts, friction, glue shear strength, etc.). This means that the sensor will not fail by becoming detached from the surface.

To contrast once more with load cells, since the load path runs through parts of the load cell, the load cell is more likely to be taken beyond a linear limit when excessive force is applied. This can cause permanent deformations, leading to zero-strain offsets, and even in extreme cases, mechanical failure of the load cell.

The bridging portion may be thicker than at least the first or second upstanding wall to which the strain sensing element is secured.

The bridging portion may be thicker than both the first and second upstanding walls.

The first or second upstanding wall to which the strain sensing element is secured may be thicker than the other of the first or second upstanding wall; this may attenuate strain at the sensing element as the other wall will deform more, which may be advantageous in applications subject to high strain Alternatively, the first or second upstanding wall to which the strain sensing element is secured may be thinner than the other of the first or second upstanding wall; this may increase sensitivity as the sensing element will experience more deformation.

Both the first and second upstanding walls may be of substantially the same thickness.

The thickness of the bridging portion may be measured in a direction which is generally perpendicular to a bridging direction. The thickness of the first or second upstanding wall may be measured in a direction which is generally parallel to the bridging direction.

The first and second mounting pads may be thicker than at least the first or second upstanding wall to which the strain sensing element is secured. The thickness of the first and second mounting pads may be measured in a direction which is generally perpendicular to a bridging direction.

The first and second mounting pads may be arranged for securing by a fixing, such as a bolt.

The first and second mounting pads may be arranged to be bonded to the surface, for example, by a suitable adhesive.

The first and second mounting pads, first and second upstanding walls and bridging portion may be formed from a single piece of material.

The first and second mounting pads, first and second upstanding walls and bridging portion may be formed by machining.

The first and second mounting pads, first and second upstanding walls and bridging portion may be machined from an extruded section of material.

The first and second mounting pads, first and second upstanding walls and bridging portion may be formed of steel.

The strain sensing element may only be provided on said one of the first and second upstanding walls.

Said one of the first and second upstanding walls to which the strain sensing element is secured may have generally opposed first and second sides. The strain sensing element may only be provided on one of the first and second sides. This may make the manufacturing process more straightforward and/or cheaper.

The strain sensing element may comprise a plurality of sub elements.

A first sub element may be located on a first portion of said one of the first and second upstanding walls to which the strain sensing element is secured. A second sub element may be located on a second portion of said one of the first and second upstanding walls to which the strain sensing element is secured. Said bridging portion may extend between the first and second upstanding walls in a first direction. The strain gauge may be configured such that when said surface is deformed in a direction generally parallel to the first direction, one of said first portion of the upstanding wall and said second portion of the upstanding wall undergoes compressive deformation, and the other of said first portion of the upstanding wall and said second portion of the upstanding wall undergoes tensile deformation. The strain gauge may be configured such that, when said surface is deformed in a direction generally parallel to the first direction, the upstanding wall to which the strain sensing element is secured undergoes a generally S-shaped deformation—that is to say such that the cross-section of the relevant deformed upstanding wall when viewed from a direction generally perpendicular to both the first, bridging direction and the direction the upstanding walls extend away from the surface, has a general S shape.

The strain sensing element may comprise four sub elements.

The four sub elements may be connected in a bridge configuration.

A third sub element may be located on a third portion of said one of the first and second upstanding walls to which the strain sensing element is secured. A fourth sub element may be located on a fourth portion of said one of the first and second upstanding walls to which the strain sensing element is secured. The strain gauge may be configured such that when said surface is deformed in said direction generally parallel to the first direction, one of said third portion of the upstanding wall and said fourth portion of the upstanding wall undergoes compressive deformation, and the other of said third portion of the upstanding wall and said fourth portion of the upstanding wall undergoes tensile deformation.

The strain sensing element may be encapsulated. This may prevent the ingress of foreign contaminants.

The strain gauge may be arranged to measure a strain selected from the group consisting of: at least 500 microstrain, at least 800 microstrain, at least 1000 microstrain, at least 1200 microstrain, at least 2800 microstrain and at least 6000 microstrain.

The strain gauge may be arranged to measure strains from about 100 to about 10,000 microstrain. The strain gauge may be arranged to attenuate the strain applied on the strain gauge by the portion of the object to which the strain gauge is mounted down to a level of between 400 and 1000 microstrain applied to the sensing element. For example, the strain gauge may be arranged to attenuate a strain of about 8000 microstrain applied by the object to the strain gauge down to a strain of about 500 microstrain applied to the sensing element. In such an example, although a strain of only about 500 microstrain is applied to the sensing element, the strain gauge will measure a strain applied to the strain gauge of about 8000 microstrain.

The strain gauge may be arranged to have a compliance which attenuates a first strain experienced between the first and second portions of the surface to a second strain experienced by said one of the first and second upstanding walls to which the sensing element is secured, wherein the first strain is substantially larger than the second strain.

The first strain may be selected from the group consisting of: greater than about two times the second strain, greater than about five times the second strain, and greater than about ten times the second strain.

According to a second aspect of the invention there is provided a strain gauge for mounting on a surface, the strain gauge comprising a first end for securing to a first potion of the surface, a second end for securing to a second portion of the surface, a bridging portion extending between the first and second ends, the bridging portion including a measurement surface, and a strain sensing element secured to the bridging portion, wherein the strain gauge extends in a first direction from said first end to said second end, wherein the strain gauge is configured such that, when said surface is deformed in a direction generally parallel to the first direction, a first portion of the measurement surface undergoes compressive deformation, and a second portion of the measurement surface undergoes tensile deformation, and wherein the strain sensing element includes a first sub element arranged to sense deformation of the first portion of the measurement surface, and a second sub element arranged to sense deformation of the second portion of the measurement surface.

By using sensing sub elements to measure compressive deformation and tensile deformation respectively on the same surface, results in a relatively straightforward construction of the strain gauge.

The first sub element may be mounted to the first portion of the measurement surface and the second sub element may be mounted to the second portion of the measurement surface.

The strain gauge may be configured such that, when said surface is deformed in a direction generally parallel to the first direction, the upstanding wall to which the strain sensing element is secured (and hence the measurement surface) undergoes a generally S-shaped deformation—that is to say such that the cross-section of the relevant deformed upstanding wall (or measurement surface) when viewed from a direction generally perpendicular to both the first, bridging direction and a direction extending away from the surface, has a general S shape.

The first end may comprise a first mounting pad and the second end may comprise a second mounting pad.

The first and second mounting pads may be arranged for securing by a bolt.

The first and second mounting pads may be arranged to be bonded to the surface.

The strain sensing element may comprise third and fourth sub elements.

The first, second, third and fourth sub elements may be connected in a bridge configuration.

The strain gauge may be configured such that, when said surface is deformed in a direction generally parallel to the first direction, a third portion of the measurement surface undergoes compressive deformation, and a fourth portion of the measurement surface undergoes tensile deformation, and wherein the third sub element is arranged to sense deformation of the third portion of the measurement surface, and wherein the fourth sub element arranged to sense deformation of the fourth portion of the measurement surface.

The strain sensing element may be encapsulated. This may prevent the ingress of foreign contaminants.

The strain gauge may be arranged to measure a strain selected from the group consisting of: at least 500 microstrain, at least 800 microstrain, at least 1000 microstrain, at least 1200 microstrain, at least 2800 microstrain and at least 6000 microstrain. The strain gauge may be arranged to have a compliance which attenuates a first strain experienced between the first and second portions of the surface to a second strain experienced by said measurement surface, wherein the first strain is substantially larger than the second strain.

The first strain may be selected from the group consisting of: greater than about two times the second strain, greater than about five times the second strain, and greater than about ten times the second strain.

Specific embodiments of the present invention will now be described, by way of example only, with reference to the accompanying drawings in which:

FIG. 1 shows a schematic cross section through a strain gauge according to an embodiment of the present invention, in use;

FIG. 2 shows a schematic perspective view of a portion of the strain gauge shown in FIG. 1;

Figure 3:
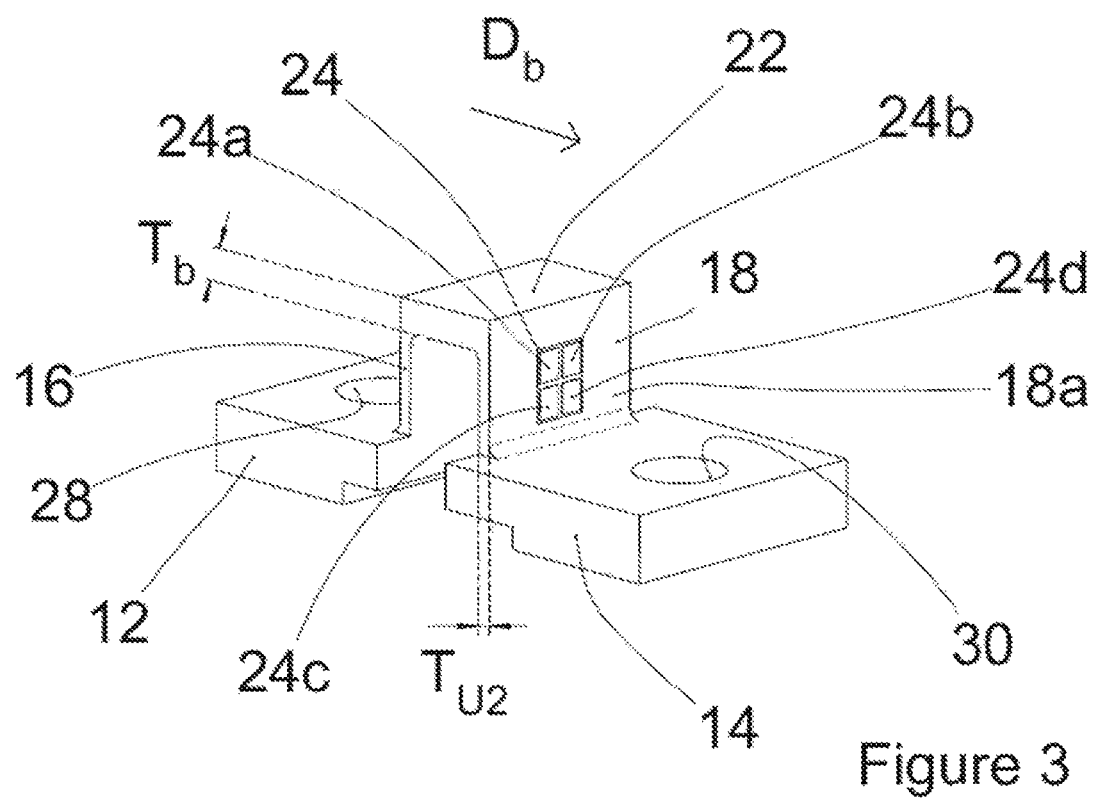
FIG. 3 shows a schematic perspective view of a portion of the strain gauge shown in FIGS. 1 and 2, the portion of the strain gauge being unloaded.

FIGS. 1 to 6 all show a strain gauge (or portion of a strain gauge according to a first embodiment of the present invention).

FIG. 1 shows a schematic cross section of a strain gauge 10 according to a first embodiment of the present invention. The strain gauge 10 is shown in use. The strain gauge 10 includes a first amounting pad 12 at a first end of the strain gauge, and a second mounting pad 14 at a second end of the strain gauge. The first and second mounting pads 12, 14 have respective first and second upstanding walls 16, 18 which extend away from a surface 20 to which the strain gauge 10 is mounted. The first and second upstanding walls 16, 18 are bridged by a bridging portion 22 which extends between the first and second upstanding walls 16, 18. The strain gauge includes a strain sensing element 24 which is secured to the second upstanding wall 18. In other embodiments the sensing element may be secured to the first upstanding wall instead of the second upstanding wall.

A wire 26 links the sensing element to the input of a suitable strain sensing device (not shown).

The first and second mounting pads 12, 14 each include an aperture or bolthole 28, 30.

As can be seen in FIGS. 1 and 2 the boltholes 28, 30 are configured to receive respective bolts 32, 34 for securing the strain gauge to the surface 20. It should be noted that the bolts have been omitted from FIGS. 3, 4, 6, 7 and 8 for the purpose of aiding clarity.

It will be appreciated that, although the present embodiment utilises bolts in order to mount or secure the strain gauge 10 to the surface 20, in other embodiments any appropriate method of mounting the strain gauge 10 to the portion of the object on which strain is to be measure may be used. For example, in other embodiments, a type of fixing other than bolts may be used. In addition to or as an alternative to the use of fixings, the mounting pads 12, 14 may be arranged to be bonded to the relevant surface, for example, by an appropriate adhesive.

The first and second mounting pads 12, 14, first and second upstanding walls 16, 18 and bridging portion 22 are formed from a single piece of material. It will be appreciated that in other embodiments this need not be the case—that is to say, in some embodiments, at least one of the mounting pads, upstanding walls, and bridging portion may be a separate part to the others, and may be formed from a different material. In the present embodiment, the first and second mounting pads 12, 14, first and second upstanding walls 16, 18 and bridging portion 22 have been machined from a single piece of material. In particular, in the present case, the single piece of material is an extruded section of material. However, in other embodiments, this need not be the case. The first and second mounting pads 12, 14, upstanding walls 16, 18 and bridging portion 22 may be formed from any appropriate material. For example, they may be formed from a suitable metal, such as steel.

As shown in FIG. 1, the strain gauge includes an outer casing which covers the mounting pads 12, 14, the upstanding walls 16, 18 and the bridging portion 22. The casing 36 is shown within FIG. 1 in dashed line. The casing is omitted from the other figures for the purpose of aiding clarity.

In the present embodiment the casing 36 is formed of a plastic material and includes two apertures located above the apertures 28 and 30 of the mounting pads 12, 14 such that, in use, a bolt 32, 34 can be inserted through the apertures in the casing into the apertures 28, 30 in the mounting pads 12, 14. In other embodiments the casing 36 may be formed from any appropriate material and/or the casing may not include apertures but rather be configured so that it can located over the mounting pads 12, 14, upstanding walls 16, 18, bridging portion 22 and bolts 32, 34 once the bolts have been installed so as to mount the strain gauge to the surface. Whilst the shown design of casing which includes apertures for the bolts facilitates easy attachment and removal of the strain gauge to/from the relevant surface, the design of casing which does not include any apertures for the bolts is more impervious to foreign contaminants.

As compared to known strain gauges which do not include upstanding walls of the type of the present invention, a strain gauge according to the present invention is designed to offer some compliance so as to reduce the load that needs to be applied via the mounting pads in order to produce a worthwhile signal and thereby enable detection of a change in strain on the portion of the object (e.g. surface) to which the strain gauge is mounted. The way in which this is achieved and the benefits of doing so are discussed in more detail below.

As previously discussed, unlike some known strain gauges, a strain gauge according to the present invention includes first and second upstanding walls 16, 18 which extend away from the surface 20 to a bridging portion 22 which extends between the first and second upstanding walls 16, 18. This can be seen both clearly in FIG. 3. Put another way, FIG. 3 shows the first and second upstanding walls 16, 18 and the bridging portion 22 spanning over a gap between the first and second mounting pads 12, 14. As can be seen from this Figure, the bridging portion 22 is thicker than at least the second upstanding wall 18 to which the strain sensing element 24 is secured.

When it is said that the bridging portion is thicker than at least the second upstanding wall 18, what is meant is that the thickness of the bridging portion $T_b$ in a direction generally parallel to the direction in which the upstanding walls 16, 18 extend away from the surface 20 is greater than the thickness $T_{u2}$ of the second upstanding wall 18 in a direction generally perpendicular to the direction in which the upstanding walls 16, 18 extend away from the surface 20. The thickness of the second upstanding wall 18 may also be said to be measured in a direction generally parallel to a bridging direction $D_b$ which is the direction in which the bridging portion extends between the first and second upstanding walls 16, 18.

The bridging portion 22 has a thickness in the direction parallel to that in which the upstanding walls extend away from the surface which is greater than the thickness of both the first and second upstanding walls (in a direction parallel to the direction Db). Within the embodiment shown in FIGS. 1-7, the thickness of each of the first and second upstanding walls 16, 18 (in the direction generally parallel to the direction Db) is substantially the same. Within the embodiment shown in FIG. 8 (discussed in more detail later), the thickness of the second upstanding wall 18 to which the sensing element 24 is secured is greater than that of the first upstanding wall 16a.

The thickness of the mounting pads 12, 14 in a direction parallel to that in which the first and second upstanding walls extend away from the surface, is greater than that of the thickness of the upstanding wall 18 to which the sensing element is secured (said distance being measured in a direction which is generally parallel to the direction Db).

As a consequence of the bridging portion 22 being thicker than the second upstanding wall 18, when the strain gauge is mounted to a surface and experiences deformation of the surface in a direction generally parallel to $D_b$, due to strain on the surface in a direction parallel to $D_b$, the upstanding wall 18 will undergo more deformation as a result of the strain on the surface as compared to that undergone by the bridging portion. Because the deformation undergone by the second upstanding wall 18 is greater than that undergone by the bridging portion for a given amount of strain on the surface which is measured by the strain gauge, it will be relatively easy to measure deformation (and hence strain on the portion of the object to which the strain gauge is mounted) by measuring deformation of the second upstanding wall 18.

This compliance within the strain gauge, whereby the second upstanding wall (i.e. the wall to which the strain sensing element is secured) is preferentially deformed has an additional benefit.

In some known strain gauges there is a relatively stiff central element which extends between the first and second ends of the strain gauge. As strain is applied by the object to which the strain gauge is attached, the central element transmits a force between the first and second ends of the strain gauge (in the case where the strain gauge is fixed at each end to the object using bolts, the force is transmitted between the two bolts). In some instances, the strain applied to the strain gauge by the object to which the strain gauge is mounted can result in a force (or load) being applied between the bolts via the central element which exceeds the frictional force provided by the bolts which secure each end of the strain gauge to the object. If this occurs then, because the force between the bolts is greater than the frictional force securing each end of the strain gauge to the object, the strain gauge will move relative to the object to which it is secured. This will result in the strain gauge providing inaccurate readings as to the strain on the object.

In order to overcome this problem, as discussed above, the structure of the strain gauge according to the present invention is compliant such that it attenuates the strain resulting in the strain within the strain gauge being significantly less than the strain applied by the object to which the strain gauge is mounted. This means that the force transmitted between the first and second ends of the strain gauge according to the present invention is less, for a given strain applied to the strain gauge, as compared to that for known strain gauges which include a relatively stiff central element. In turn, this means that, for a given strain applied to the strain gauge, it is much less likely that the force within the strain gauge caused by strain applied to the strain gauge will result in the securing friction between the strain gauge and the object to which the strain gauge is mounted being overcome. For example, if the strain gauge is mounted to the object using a fixing, such as bolts, the present invention makes it less likely that the securing frictional force resulting from the bolts will be overcome, thereby reducing the possibility of resultant relative movement between the strain gauge and the object to which it is mounted, and hence inaccurate strain measurement by the strain gauge. As a consequence of this, a strain gauge according to the present invention can be used in applications where high levels of strain would usually preclude the use of known conventional bolt-on strain gauges.

As an example of the attenuation in strain provided by a strain gauge according to the present invention, the strain applied to the strain gauge may be one or more of: at least 100 microstrain; at least 500 microstrain; at least 800 microstrain, at least 1000 microstrain, at least 1200 microstrain, at least 2800 microstrain; at least 6000 microstrain; and at least 10000 microstrain. The attenuated strain applied to the sensing element may be between about 100 microstrain and about 1000 microstrain. The attenuated strain applied to the sensing element may be between about 400 microstrain and about 1000 microstrain. The strain applied to the strain gauge may be one or more of: greater than about two times the strain applied to the sensing element, greater than about five times the strain applied to the sensing element, and greater than about ten times the strain applied to the sensing element.

In an example of an application of a strain gauge according to the present invention the strain gauge may be used to measure loading on an axle of a vehicle. In some embodiments the operating strain measured by the strain gauge may be about 500 microstrain and the dynamic strain may be about 1200. In other embodiments the operating strain measured by the strain gauge may be about 800 microstrain and the dynamic strain may be over 2800 microstrain. In other embodiments the strain gauge may be used to measure a strain of about 6000 microstrain under explosive conditions.

The design of a strain gauge according to the present application allows the flexibility to select the overall sensor stiffness and the level of strain attenuation. This is discussed in more detail at a later point within this document.

Figure 4:
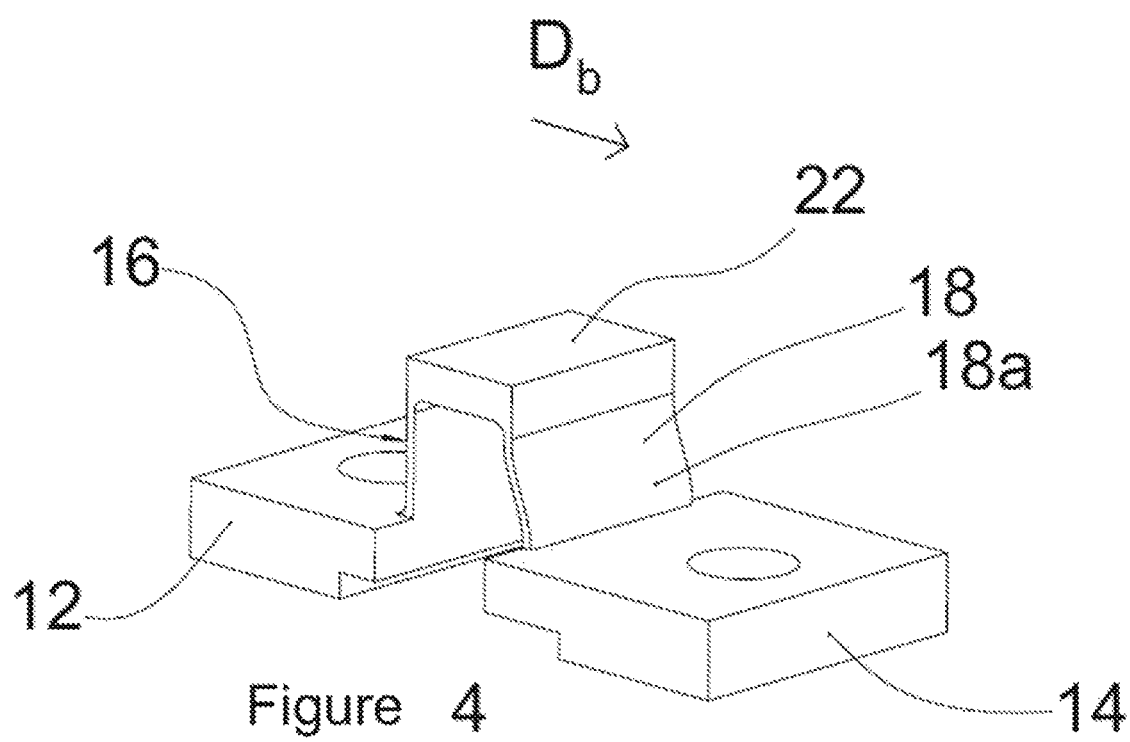
FIG. 4 shows a schematic perspective view of the portion of the strain gauge shown in FIG. 3, the portion of the strain gauge being under load.

FIG. 3 shows a schematic view of a portion of a strain gauge according to an embodiment of the present invention in which the strain gauge is not experiencing any strain from the object or surface to which it is attached. By contrast, FIG. 4 shows a schematic view of the same portion of strain gauge, in which a strain has been applied to the strain gauge by the object to which it is mounted, in a direction parallel to the bridging direction $D_b$, which causes a relative separation of the first and second mounting pads (or first and second end) of the strain gauge. Within FIG. 4, the sensing element 24 has been omitted so that the effect of the strain being applied to the strain gauge can be seen more clearly.

Figure 5:
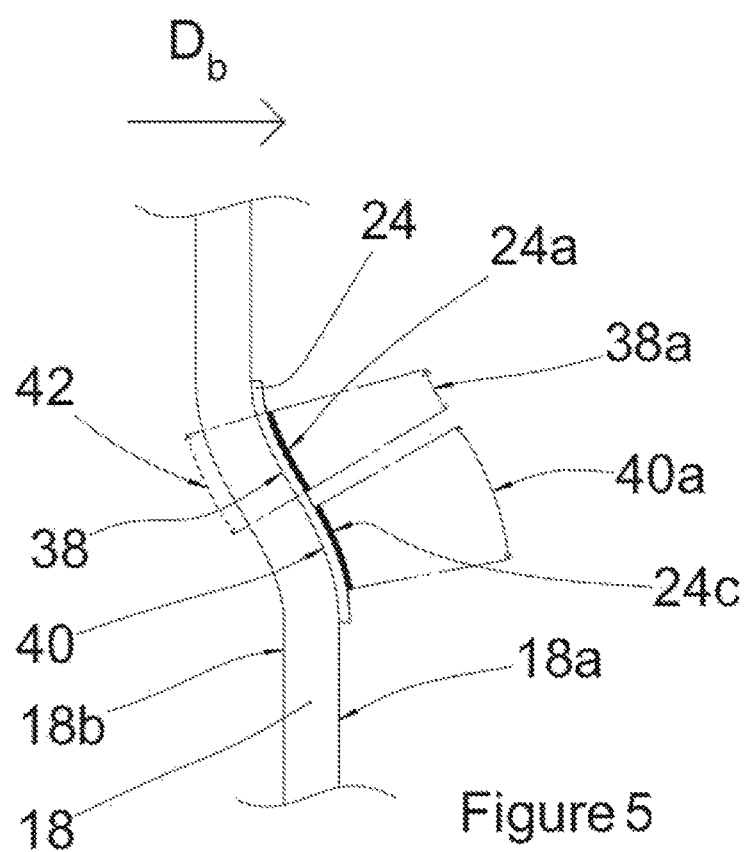
FIG. 5 shows a schematic side view of a portion of a strain gauge when under load as shown in FIG. 4.

It can be seen that the strain between the first and second mounting pads (resulting from a force between the first and second mounting pads) has caused the second upstanding wall 18 to deform. Because the force caused by the applied strain is generally parallel to the bridging direction $D_b$, the deformation of the second upstanding wall 18 is also in the bridging direction $D_b$ (of course, if the force caused by the applied strain is in another direction, the deformation of the second upstanding wall would also be in said direction). In order to discuss the deformation of the second upstanding wall 18 more clearly, FIG. 5 shows a schematic side view of a portion of the second upstanding wall 18 as viewed from the side. The deformation has been exaggerated and generalised for the purposes of aiding explanation.

As can be see in FIGS. 4 and 5, when the strain gauge 10 has a strain applied to it by the portion of the object to which it is mounted which urges the first and second mounting pads 12, 14 to move relative to one another such that they separate (which is equivalent to the second mounting pad 14 moving parallel to the bridging direction $D_b$ relatively away from the first mounting pad 12), the second upstanding wall 18 is deformed from having an un-deformed (or unloaded) cross section (when viewed from the side, as shown in FIG. 5, in a direction which is generally perpendicular to both the direction $D_b$ and the direction in which the upstanding walls extend away from the surface) which is relatively straight or linear to one which is generally S-shaped.

The generally S-shaped cross section of the second upstanding wall 18 results in the second upstanding wall 18 having a first portion 38 which undergoes compressive deformation and a second portion 40 which undergoes tensile deformation. In more detail, the first portion 38 of the second upstanding wall 18 is the portion of surface 18a of the second upstanding wall 18 which is located between a first pair of dashed lines within FIG. 5 as indicated by reference numeral 38a. Likewise, the second portion 40 of the upstanding wall 18 is the portion of the surface 18a of the second upstanding wall 18 which is located between the pair of dashed lines within FIG. 5 indicated by the reference numeral 40a.

Figure 6:
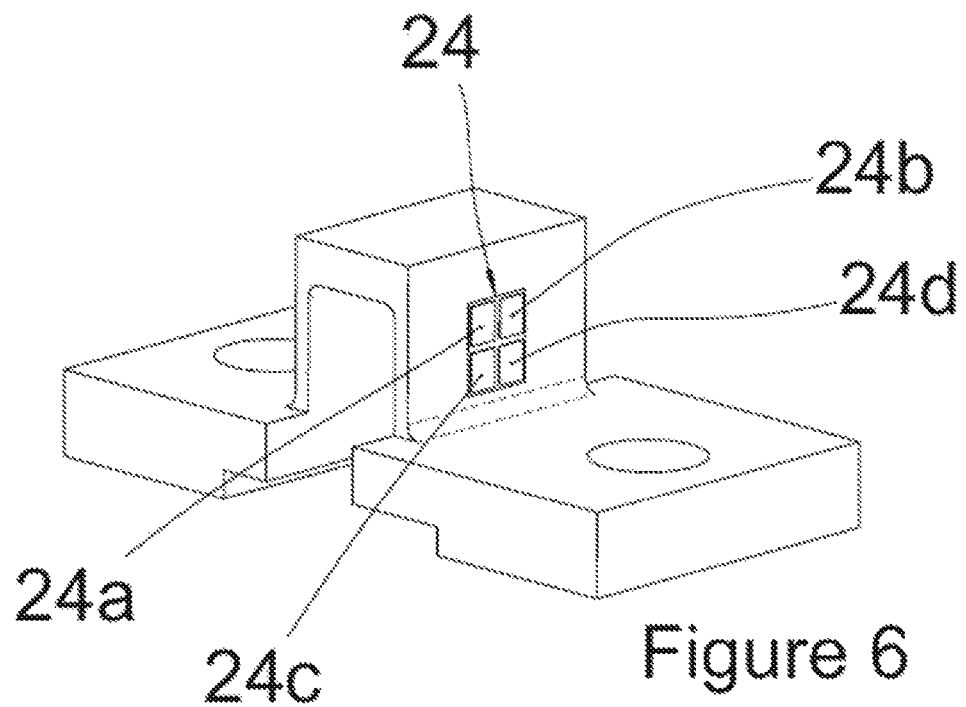
FIG. 6 shows another schematic perspective view of a portion of the strain gauge as shown in the previous figures.

As previously discussed, the strain gauge includes a strain sensing element 24 which is secured to the second upstanding wall 18 (however, the sensing element is not shown in FIGS. 4 and 6 so as to aid clarity). In more detail, the strain sensing element 24 is only provided on the second upstanding wall 18. More particularly it can be seen that the second upstanding wall 18 has opposed first and second sides (or surfaces) 18a, 18b and the strain sensing element 24 is only provided on one of the first and second sides 18a, 18b—in particular, the first side 18a.

The strain sensing element 24 comprises plurality of sub elements. In the presently described embodiment, the strain sensing element 24 comprises four sub elements 24a, 24b, 24c and 24d. However, it will be appreciated that in other embodiments any appropriate number of sub elements may be used.

In general terms the sub elements 24a to 24d are arranged as quadrants of a square.

In the present embodiment each of the sub elements 24a to 24d are the same (however, in other embodiments, this need not be the case). Each of the sub elements 24a to 24d takes the form of a known conventional foil strain gauge which consists of an insulating flexible backing which supports a boustrophedonic conductive metallic foil pattern. The exact structure and functioning of the sub elements is entirely conventional and is not of particular relevance to the present invention—consequently, further discussion of this is omitted for the sake of brevity.

In reference to FIG. 5, it can be seen that the first sub element 24a is located such that it is generally located on the first portion 38 of the second upstanding wall 18; and a second sub element 24c is generally located on the second portion 40 of the second upstanding wall 18. In this way, the first sub element 24a is located and arranged to measure the compressive deformation experienced by the first portion 38 of the second upstanding wall 18 when the surface to which the strain gauge is mounted is deformed in a direction generally parallel to the direction $D_b$. Likewise, the second sub element 24c is located and arranged such that it can measure the tensile deformation that the second portion 40 of the second upstanding wall 18 undergoes when the surface to which the strain gauge is mounted is deformed in a direction generally parallel to direction $D_b$.

Should the surface to which the strain gauge is mounted be deformed in a direction opposite (or anti-parallel) to the direction $D_b$, the first portion 38 of the second upstanding wall 18 will undergo tensile deformation, which will be measured by the first sub element 24a, and the second portion 40 of the second upstanding wall 18 will undergo compressive deformation, which be measured by the second sub element 24c.

It will be noted that the location of the first sub element 24a and second sub element 24c with respect to the first portion 38 and second portion 40 of the second upstanding wall 18 is equivalent to the location of a third sensing element 24b and fourth sensing element 24d respectively. That is to say, the third sub element is located on a third portion of the second upstanding wall 18 which undergoes compressive deformation in the same manner as the first portion 38. Likewise, the fourth sub element 24d is located on a fourth portion of the second upstanding wall 18 which undergoes tensile deformation in the same manner as the second wall portion 40.

In order for the strain gauge to produce a reasonable signal indicative of the strain which is being applied to it, it is beneficial for the sensing element to have two sub elements—one which measures compressive deformation on a portion of the strain gauge and another one which measures a corresponding tensile deformation of said portion of the strain gauge. One way in which such corresponding, compressive and tensile deformations have been measured in known strain gauges is that a first sub element is located on a first side of a portion of the strain gauge and the second sub element is located on an opposed side of the portion of the strain gauge. For example, with reference to FIG. 5, a known strain gauge may include a first sub element which is located at the same position as the sub element 24a within the present embodiment of the invention, and the second sensor element would be located on the other side of the wall 18 as indicated by the dashed lines 42. The applicant has realised that locating a sensing element on either side of a portion of the strain gauge is relatively complicated in terms of a manufacturing process, thereby leading to an increase in time and cost of manufacture. In order to overcome this problem, the present invention has a first sub element 24a which is located on the same side (or surface) of a portion of the strain gauge (in the present case, the second upstanding wall 18) as the second sub element 24c. Applying both the first sub element 24a and the second sub element 24c to the same side of the relevant portion of the strain gauge is a relatively straightforward operation which reduces the assembly time and cost of a strain gauge according to the present invention. The ability for a strain gauge according to the present invention to have first and second sub elements located on the same surface, and which measure corresponding compressive deformation and tensile deformation respectively, is due to the second upstanding wall (and hence outer surface of the second upstanding wall) undergoing S-shaped (simultaneous compressive and tensile) deformation as discussed above.

This aspect of the present invention, whereby the first and second sub elements are arranged on the same side or surface of a relevant portion of the strain gauge may also be defined as follows. The strain gauge for mounting on a surface includes a first end (in this case including the first mounting pad 12) for securing to a first portion of the surface, a second end (including the second mounting pad 14) for securing to a second portion of the surface, and a bridging portion (including the upstanding walls 16, 18 and portion 22) which extends between the first and second ends. It will be appreciated that in other embodiments of the present invention the first and second ends may have any appropriate configuration or shape, as may the bridging portion.

The bridging portion includes a measurement surface. In the present example, the measurement surface is the first surface or side 18a of the second upstanding wall 18. A strain sensing element 24 is secured to the bridging portion.

Strain gauge extends in a first direction $D_b$ from the first end to the second end.

The strain gauge is configured such that when the surface to which the strain gauge is deformed in use in a direction generally parallel to the first direction $D_b$, a first portion 38 of the measurement surface 18a undergoes compressive deformation, and a second portion 40 of the measurement surface 18a undergoes tensile deformation.

The strain sensing element 24 includes a first sub element 24a and a second sub element 24c. The first sub element 24a is arranged to sense deformation of the first portion 38 of the measurement surface 18a, and the second sub element 24c is arranged to sense deformation of the second portion 40 of the measurement surface 18a.

As previously discussed, the first and second mounting pads 12, 14 may be arranged for securing by a bolt (by use of bolt holes 28, 30) and/or arranged to be bonded to the surface (for example using an adhesive or similar). The strain sensing element also includes third and fourth sub elements 24b, 24d. When the surface to which the strain gauge is mounted is deformed in use in a direction generally parallel to the first direction $D_b$, a third portion of the measurement surface (similar to the first portion) undergoes compressive deformation, and a fourth portion of the measurement surface (similar to the second portion 40) undergoes tensile deformation. The third sub element 24b is arranged to sense deformation of the third portion of the measurement surface 18a and the fourth sub element 24d is arranged to sense deformation of the fourth portion of the measurement surface 18a.

The strain sensing element 24 is encapsulated. By this what is meant is that all of the sub elements of the sensing element are enclosed by a protective coating. This helps to protect the sensing element from the ingress of any foreign substance (e.g. water or dust) which may adversely affect the operation of the strain gauge.

Figure 7:
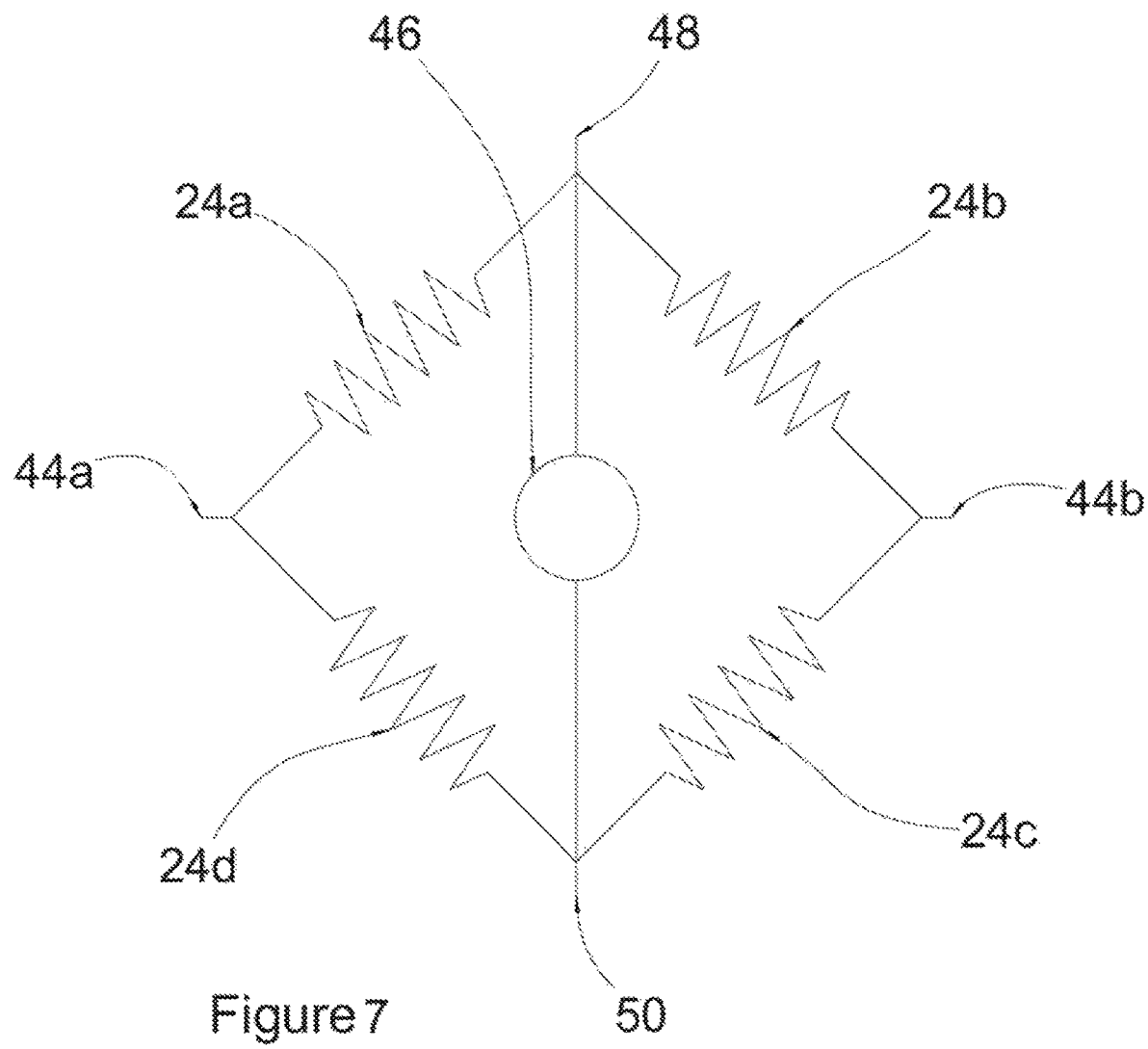
FIG. 7 shows a schematic view of a bridge circuit of which a sensing element of the strain gauge of the previous figures forms part.

In order to measure the changes in resistance of the sensing sub elements 24a to 24d (in order to obtain a measurement indicative of the strain applied to the strain gauge) the four sub elements 24a to 24d are connected in a bridge configuration. One such known bridge configuration is shown schematically in FIG. 7. FIG. 7 shows a schematic view of a Wheatstone bridge. The Wheatstone bridge is operated in the conventional manner whereby an excitation voltage is applied across the circuit via points 44a and 44b, and an output voltage is measured by a voltage measuring device 46 across nodes 48 and 50 of the circuit. The structure and operation of a Wheatstone bride circuit is well known. Consequently, for the sake of brevity, further discussion in relation to this is omitted.

As previously discussed, one benefit of a strain gauge according to the present invention is that the strain gauge is designed to attenuate the overall strain transmitted from the portion of the object to which the strain gauge is mounted to the strain gauge sensing element via the second upstanding wall. As well as reducing the loads transmitted between the ends of the strain gauge and enabling the strain gauge to measure high levels of strain which would preclude the use of conventional bolt-on strain sensors, this feature also has the benefit that it reduces sensor element fatigue. The reason for this is that the less strain that is transmitted to the strain sensing element, the less strain the components of the sensor element will be subjected to, hence the less fatigue that is suffered by the sensor element. This can help to improve the operating lifetime and accuracy of the sensing element and hence the strain gauge.

Figure 8:
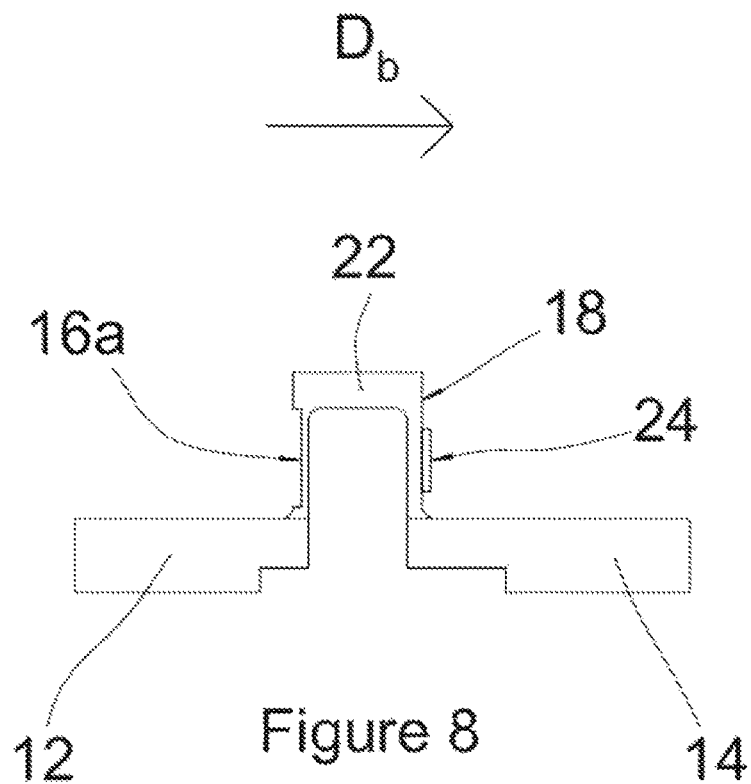
FIG. 8 shows a side view of a portion of a second embodiment of strain gauge.

It is possible to tune the attenuation of the strain transmitted to the strain gauge sensing element and hence to tune the signal output of the strain gauge. One way in which this can be achieved is illustrated in FIG. 8. FIG. 8 shows a further embodiment of strain gauge according to the present invention. Within this Figure equivalent features to those within the previously illustrated embodiment have been given the same reference numerals. The only difference between the embodiment shown in FIG. 8 and that shown in FIGS. 1-7 is that the first upstanding wall 16a is thinner (in the direction $D_b$) than the first upstanding wall 16 of the embodiments shown in FIGS. 1-7.

The reduction in thickness of the first upstanding wall 16a may be achieved in any appropriate manner. For example, the wall may be machined so that it has the reduced thickness. Alternatively, the sensing gauge may be manufactured from an extruded portion in which the extrusion dye is configured so as to produce a first upstanding wall of reduced thickness. In the present embodiment the reduced thickness of the first upstanding wall 16a is achieved by abrading or laser abrading the first upstanding wall.

Reducing the thickness of the first upstanding wall 16a has the effect of reducing the overall stiffness of the strain gauge (or, put another way, increases the overall compliance of the strain gauge). By reducing the overall stiffness of the strain gauge, the amount of strain which is exerted on the strain gauge by the portion of the object to which the strain gauge is mounted that is transmitted to the sensing element is reduced. Consequently, for a given strain applied to the strain gauge by the portion of the object to which the strain gauge is mounted, a strain gauge having a reduced thickness of first upstanding wall (and therefore reduced overall stiffness) will produce a reduced magnitude of change of signal as compared to that having a first upstanding wall in which the thickness is not reduced.

Figure 9:
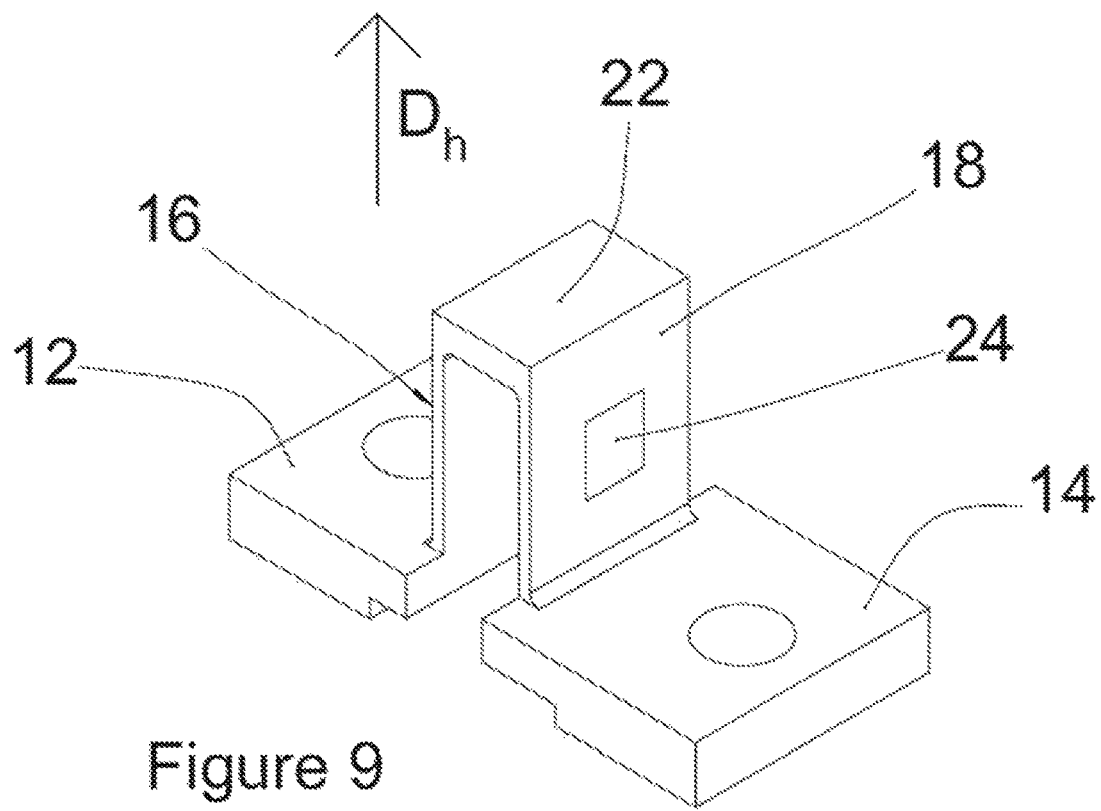
FIG. 9 shows a schematic perspective view of a portion of a third embodiment of strain gauge.

Another way of modifying the overall stiffness of the strain gauge and thereby modifying the amount of strain which is transmitted from the portion of the object to which the strain gauge is mounted to the strain sensing element is shown in FIG. 9. FIG. 9 shows a schematic perspective view of a further embodiment of strain gauge according to the present invention. The embodiment shown within FIG. 9 is identical to that shown in FIGS. 1-7 (and consequently the same reference numerals have been used for equivalent features) except that the height to which the first and second upstanding walls 16, 18 extend away from the surface (in a direction parallel to that illustrated by $D_h$) is greater. The greater height of the first and second upstanding walls 16, 18 as compared to that of the strain gauge shown in FIGS. 1-7 results in the overall stiffness of the strain gauge shown in FIG. 9 being reduced as compared to that of the strain gauge shown in FIGS. 1-7. In other words, the strain gauge shown in FIG. 9 is more compliant than that shown in FIGS. 1-7. Because the strain gauge shown in FIG. 9 has an increased overall compliance as compared to that of the strain gauge shown in FIGS. 1-7, for a given strain applied to the strain gauge by the portion of the object to which the strain gauge is mounted, in use, a reduced amount of strain is transmitted to the strain sensing element 24 as compared to that in the embodiment shown in FIGS. 1-7. Consequently, for a given amount of strain applied to the strain gauge, the strain gauge in FIG. 9 will produce a lesser magnitude change in signal as compared to that of the strain gauge shown in FIGS. 1-7.

Other ways in changing the overall stiffness/compliance of a strain gauge according to the present invention are also contemplated. For example, increasing the length of the upstanding walls and bridging portion in a direction perpendicular to both direction $D_b$ and $D_h$ will increase the overall stiffness of the strain gauge and reduce the overall compliance of the strain gauge. In addition or alternatively, the strain gauge (or portions of the strain gauge) may be manufactured from a material having a different stiffness to that of steel. Utilising a material which has a reduced stiffness (increased compliance) will result in the strain gauge having an overall stiffness which is reduced (i.e. having increased compliance).

By changing the overall stiffness/compliance of the strain gauge using any combination of the different methods discussed above, it is possible to change the strain gauge output signal for a given strain sensing element and strain applied to the strain gauge. As such, using any of the methods discussed above, it is possible to tune the strain gauge such that a particular strain applied to the strain gauge when utilising a particular type of strain sensing element produces a desired magnitude of output signal.

It will be appreciated that numerous modifications to the above described embodiments may be made without departing from the scope of the invention as defined in the amended claims.

For example, although the described embodiments utilise a strain sensing element of a metallic foil type, in other embodiment, any other appropriate type of sensing element or sub element may be used, provided it can provide a measurement indicative of compressive/tensile deformation, as appropriate, and hence of applied strain. Examples of such alternative strain sensing elements include wire type strain gauge sensing elements and semi-conductor type strain gauge sensing elements, both of which are well known in the art.

The invention claimed is:

1. A strain gauge for mounting on a surface to measure strain in the surface, the strain gauge comprising first and second mounting pads arranged for securing to respective first and second portions of the surface, the first and second mounting pads having respective first and second upstanding walls each arranged to extend away from the surface to a bridging portion extending between the first and second upstanding walls, the strain gauge having a strain sensing element secured to one of the first and second upstanding walls,
wherein the first and second mounting pads are configured for securing to the respective first and second portions of the surface such that relative separation of the first and second portions causes relative separation of the first and second mounting pads.

2. The strain gauge according to claim 1, wherein the bridging portion is thicker than at least the first or second upstanding wall to which the strain sensing element is secured.

3. The strain gauge according to claim 1, wherein the first or second upstanding wall to which the strain sensing element is secured is thicker than the other of the first or second upstanding wall.

4. The strain gauge according to claim 1, wherein the first and second mounting pads are thicker than at least the first or second upstanding wall to which the strain sensing element is secured.

5. The strain gauge according to claim 1, wherein the first and second mounting pads are arranged to be bonded to the surface.

6. The strain gauge according to claim 1, wherein the first and second mounting pads, first and second upstanding walls and bridging portion are formed from a single piece of material.

7. The strain gauge according to claim 1, wherein said one of the first and second upstanding walls to which the strain sensing element is secured has generally opposed first and second sides, and wherein the strain sensing element is only provided on one of the first and second sides.

8. The strain gauge according to claim 1, wherein the strain sensing element comprises a plurality of sub elements and wherein a first sub element is located on a first portion of said one of the first and second upstanding walls to which the strain sensing element is secured,
wherein a second sub element is located on a second portion of said one of the first and second upstanding walls to which the strain sensing element is secured,
wherein said bridging portion extends between the first and second upstanding walls in a first direction, and
wherein the strain gauge is configured such that when said surface is deformed in a direction generally parallel to the first direction, one of said first portion of the upstanding wall and said second portion of the upstanding wall undergoes compressive deformation, and the other of said first portion of the upstanding wall and said second portion of the upstanding wall undergoes tensile deformation.

9. The strain gauge according to claim 8, wherein the strain sensing element comprises four sub elements connected in a bridge configuration.

10. The strain gauge according to claim 9,
wherein a third sub element is located on a third portion of said one of the first and second upstanding walls to which the strain sensing element is secured,
wherein a fourth sub element is located on a fourth portion of said one of the first and second upstanding walls to which the strain sensing element is secured, and
wherein the strain gauge is configured such that when said surface is deformed in said direction generally parallel to the first direction, one of said third portion of the upstanding wall and said fourth portion of the upstanding wall undergoes compressive deformation, and the other of said third portion of the upstanding wall and said fourth portion of the upstanding wall undergoes tensile deformation.

11. The strain gauge according to claim 1, wherein the strain sensing element is encapsulated.

12. The strain gauge according to claim 1, wherein the strain gauge is arranged to have a compliance which attenuates a first strain experienced between the first and second portions of the surface to a second strain experienced by said one of the first and second upstanding walls to which the sensing element is secured, wherein the first strain is substantially larger than the second strain.

13. A strain gauge for mounting on a surface to measure strain in the surface, the strain gauge comprising first and second mounting pads arranged for securing to respective first and second portions of the surface, the first and second mounting pads having respective first and second upstanding walls each arranged to extend away from the surface to a bridging portion extending between the first and second upstanding walls, the strain gauge having a strain sensing element secured to one of the first and second upstanding walls, wherein:
the first and second upstanding walls each have a proximal end that is located proximate to the bridging portion and a distal end that is spaced from the bridging portion, and
the first and second mounting pads respectively have first and second base portions, the first base portion connected to the distal end of the first upstanding wall and extending away from the distal end of the first upstanding wall in a first direction, the second base portion connected to the distal end of the second upstanding wall and extending away from the distal end of the second upstanding wall in a second direction that is opposite to the first direction.

14. The strain gauge according to claim 13, wherein the first and second mounting pads are configured for securing to the respective first and second portions of the surface such that relative separation of the first and second portions causes relative separation of the first and second base portions.

15. The strain gauge according to claim 13, wherein the bridging portion extends between the first and second upstanding walls in a bridging direction, and the first and second mounting pads are configured for securing to the respective first and second portions of the surface such that deformation of the surface in a direction generally parallel to the bridging direction causes relative separation of the first and second base portions.

16. A strain gauge for mounting on a surface to measure strain in the surface, the strain gauge comprising first and second mounting pads arranged for securing to respective first and second portions of the surface, the first and second mounting pads having respective first and second upstanding walls each arranged to extend away from the surface to a bridging portion extending between the first and second upstanding walls, the strain gauge having a strain sensing element secured to one of the first and second upstanding walls, wherein the bridging portion extends between the first and second upstanding walls in a bridging direction, and the strain sensing element is configured for measuring strain in the surface when the surface deforms generally parallel to the bridging direction.

\* \* \* \* \*